United States Patent
Polzer

(10) Patent No.: US 9,334,915 B2
(45) Date of Patent: May 10, 2016

(54) PNEUMATIC SUSPENSION AND VIBRATION ISOLATION SYSTEM EMPLOYING LOW FRICTION CABLE ISOLATORS

(71) Applicant: VALE S.A., Centro, Rio de Janeiro (BR)

(72) Inventor: Benjamin David Polzer, Sudbury (CA)

(73) Assignee: Vale S.A., Rio de Janeiro (BR)

( * ) Notice: Subject to any disclaimer, the term of this patent is extended or adjusted under 35 U.S.C. 154(b) by 144 days.

(21) Appl. No.: 14/169,040

(22) Filed: Jan. 30, 2014

(65) Prior Publication Data

US 2015/0034795 A1 Feb. 5, 2015

Related U.S. Application Data

(60) Provisional application No. 61/758,634, filed on Jan. 30, 2013.

(51) Int. Cl.
| | | |
|---|---|---|
| *F16M 11/00* | (2006.01) | |
| *F16F 9/02* | (2006.01) | |
| *F16F 15/023* | (2006.01) | |
| *B60P 7/16* | (2006.01) | |
| *B64D 3/00* | (2006.01) | |
| *B64D 43/00* | (2006.01) | |
| *F16M 13/02* | (2006.01) | |

(52) U.S. Cl.
CPC ............... *F16F 9/0209* (2013.01); *B60P 7/16* (2013.01); *B64D 3/00* (2013.01); *B64D 43/00* (2013.01); *F16F 9/0281* (2013.01); *F16F 15/0232* (2013.01); *F16M 13/02* (2013.01)

(58) Field of Classification Search
USPC .................. 248/637, 638, 651, 653, 654
See application file for complete search history.

(56) References Cited

U.S. PATENT DOCUMENTS

| | | | | |
|---|---|---|---|---|
| 5,028,180 A * | 7/1991 | Sheldon | ............... | B23Q 1/5462 248/631 |
| 5,199,690 A * | 4/1993 | Marshall | ............. | F16F 15/0232 248/619 |
| 5,333,514 A * | 8/1994 | Toyama | .................. | B25J 9/107 414/735 |
| 6,516,681 B1 * | 2/2003 | Pierrot | ................. | B25J 17/0266 74/490.01 |
| 7,172,385 B2 * | 2/2007 | Khajepour | ........... | B25J 17/0266 414/735 |
| 7,896,304 B1 * | 3/2011 | Eichinger | .............. | B63H 20/12 248/440 |
| 8,181,944 B2 * | 5/2012 | Brewster | ............... | F04D 29/668 267/136 |
| 8,215,199 B2 * | 7/2012 | Marcroft | ............. | B25J 17/0216 74/490.08 |

* cited by examiner

*Primary Examiner* — Steven Marsh
(74) *Attorney, Agent, or Firm* — Arent Fox LLP

(57) ABSTRACT

The present invention provides a suspension and vibration isolation system having cable isolators. The cable isolators employ low-friction air-bearing pneumatic cylinders and cables to isolate a suspended payload from vibrations of a carrier or to isolate the carrier from vibrations of the payload. Using such air-lubricated cylinder to piston interfaces virtually eliminates static friction and so improves the effectiveness of the isolation for small forces and displacement. The use of pneumatic cylinders also permits the system to be tuned to the required resonance frequency to isolate the payload from vibrations in a desired frequency band.

29 Claims, 5 Drawing Sheets

PNEUMATIC SUSPENSION AND VIBRATION ISOLATION SYSTEM EMPLOYING LOW FRICTION CABLE ISOLATORS

CROSS-REFERENCE TO RELATED APPLICATIONS

This application claims priority from U.S. Provisional Application No. 61/758,634, titled "A Low-Friction Pneumatic Vibration Isolator" filed on Jan. 30, 2013, and which is incorporated herein by reference in its entirety.

BACKGROUND OF THE INVENTION

Suspension and vibration isolation systems are commonplace and are used in a wide variety of applications in transportation and industry. Their purpose may be either to isolate the outside world from the vibrations of a payload, such as a motor or other vibrating device, or to isolate a payload from vibrations of its carrier. Often the isolation is desirable so as to avoid damage to equipment or discomfort to persons. Vibrations may also be a source of noise for sensors, and isolating a sensor from vibrations may significantly improve the quality of the sensed data.

In the context of this disclosure, a carrier is any object upon which a payload is to be mounted, carried or transported. A carrier may comprise a stationary or portable framework, or it may be a moving vehicle, a framework mounted to a vehicle, or a tethered object. When the carrier is a vehicle, it may traverse land, water or air. In the case of an airborne vehicle, the carrier may be a fixed or rotary wing aircraft, a lighter than air aircraft such as a blimp, zeppelin or aerostat, or a tethered airborne object. Tethered objects may include kites, or carriers towed or hung from an aircraft such as a bird, bomb or sonde as expressed in the parlance of airborne geophysics In the context of this disclosure, a payload is any object which may be suspended from a carrier. The payload may be a source of vibration which is to be isolated, or it may be an instrument to be shielded from the vibrations of its carrier. The payload may comprise a framework, an instrument or instrument platform, or a separate suspension and vibration isolation system.

When used on a moving carrier vehicle, an objective of a vibration isolation system may be to apply minimal forces on the payload above a certain frequency while the payload tracks the general trajectory of its carrier below certain frequency. In the context of this disclosure, non-constant accelerations of the payload with respect to the carrier are understood to be vibrations.

In order that a vibration isolated payload may track its carrier, space must be provided within the carrier to permit the payload to move with respect to it. In a towed airborne carrier where space is limited, it is advantageous to have the suspension system out of the way of the payload motion so as to maximize available lateral motions of the payload while minimizing the dimensions of the carrier.

When a sensing or pointing instrument is used on a mobile carrier, the performance of the instrument may be affected by the motion of the platform. Data acquired with sensors such as gravity meters, gravity gradiometers, magnetometers, induction coils, radars, lidars, accelerometers, rotation rate actuators and various optical sensor or pointing devices such as telescopes, laser trackers and rangers, and cameras may be degraded by the presence of carrier vibrations. Vibration isolation of an instrument payload from the motions of its carrier may be of critical importance in the performance of the instrument. Such effects are very important in long range airborne tracking and pointing applications, gravity and gravity gradiometry, and in airborne electromagnetic measurements.

Vibration isolation in the context of airborne electromagnetic (AEM) surveys is an important consideration in the design of such survey equipment. The sensors which measure vector components of the magnetic field are extremely sensitive to angular jitter in the presence of the Earth's magnetic field. It is recognized in the present state of the art that effective isolation of the sensors from accelerations of their carrier can help to mitigate this jitter. Such jitter may be introduced by lateral and vertical motions of the carrier, and so may only be effectively suppressed through vibration isolation in three dimensions.

In practice, a suspension and vibration isolation system is securely mounted to a rigid framework of the carrier. The suspension and vibration isolation system provides the dual function of suspending the payload from this framework, while isolating the payload or carrier from vibrations in a certain frequency band. There are four essential quantities to be considered in any suspension and isolation system:

1.1. static load or weight-bearing capability,
    1.2. softness or resonant frequency,
    1.3. dynamic friction or loss, and
    1.4. static friction or breakaway force.

The first, weight-bearing capability is characterized by the payload. The second, the softness or resonant frequency, is determined by the frequencies the payload is to be isolated from. Generally, effective isolation occurs at frequencies at least double the resonant frequency of the suspension and isolation system. The third, dynamic friction or loss, refers to the damping of the energy within the isolation system, and ideally energy will be damped without transmitting vibrations through the suspension to or from the payload. The fourth, static friction is a particular nuisance when damping low frequency vibrations, as the release of an object held by static friction causes a step acceleration on the payload. The effect of static friction can thus extend to frequencies above the resonant frequency of the suspension and isolation systems through the harmonic spectrum of the step. Static friction must be minimized as much as possible in AEM data acquisition as it prevents small amplitude vibrations at any frequency from being isolated from the payload.

In the established state of the art of AEM acquisition, vibration isolation only effectively eliminates jitter noise for magnetic measurements at frequencies above 20 Hz. Isolation methods in present state of the art AEM systems typically rely on elastometers, such as bungees, examples of which are provided in Canadian Patent No. 2,722,457 to Kuzmin and Morrison ("Double-suspension receiver Coil system and apparatus") and U.S. Publication No. 2010/0237870 to Dodds ("Geophysical prospecting using electric and magnetic components of natural electromagnetic fields"). The invention of Turner et al (U.S. Pat. No. 6,369,573) relied on springs and damping fluid, and was never commercially viable. The invention of Barringer disclosed in U.S. Pat. No. 3,115,326 used gimbals to isolate a magnetic sensor coil from rotational motion. While Barringer's device may have been useful for acquiring AEM data in the 1960s, gimbal based devices have been largely abandoned for acquiring modern high-precision AEM data.

While many vibration isolation devices operate adequately in ranges well below 25 Hz, AEM measurements require vibration isolation solutions which minimize the electromagnetic noise caused by proximate electric currents and moving metal or magnetic ferrous metal parts. They must be robust to shock and thermal changes, be lightweight, compact and operate on low-power. In the case of high precision AEM measurements, where the sensors are located in a carrier towed on a cable tens of meters below an aircraft, a hanging suspension is highly advantageous as it minimizes the structural requirements (so reducing weight) and maximizes volume within the carrier where the payload may move. AEM survey equipment must function through rough landings and over a large thermal variation, often ranging from −20 C to 40 C. Because of these constraints the broad suite of vibration isolation technologies which have been developed for other applications are unsuitable for acquiring high precision AEM data.

Thus, while the general art of vibration isolation is well established, no suitable solutions have been found for acquiring high-precision AEM data in the sub-20 Hz range. The reason for this lies in the reliance on elastomers in the present AEM state of the art, and in the intrinsic properties of vibrational isolation systems. Vibrational isolation devices have a resonant frequency which lies substantially below the lower frequency of the vibrations to be isolated. As this resonant frequency is lowered, the range of motion that a vibrational isolation device requires will increase. This makes implementing elastomer-based low frequency vibration isolation difficult to do in practice, as long elastometers may be required. As a result, elastomeric based vibration isolation methods which work well in the acquisition of AEM data above 20 Hz do not work well for sub 20 Hz AEM data acquisition.

High-precision AEM measurements require a low-power, compact, non-magnetic, non-electric, robust and lightweight vibration isolation that can be suspended in a mobile carrier, criteria which make the use of elastomers appealing. While U.S. Pat. No. 6,196,514 "Large airborne stabilization vibration isolation system" to Kleinholtz uses air bearing pneumatic mounts, it is unsuitable to acquiring low-noise AEM data in a towed bird: It is too heavy and bulky to be installed in one; it requires on voice coil actuators (a source of electromagnetic noise), and it only provides friction-free vibration isolation in one direction, from the bottom.

Accordingly, it would be advantageous to have a light, compact vibration isolation system which could provide multi-directional vibration isolation to a payload suspended from above, and which could be installed and operated in a towed airborne carrier. It would be a further advantage in the acquisition of AEM data if the vibration isolation system could substantially isolate vibrations at frequencies above 3 Hz, if it could be operated with small amounts of electrical power, and if it could be substantially constructed out of resistive and non-magnetic components so as to minimize electromagnetic noise.

SUMMARY OF THE INVENTION

A cable isolator for isolating vibrations between a carrier and a payload, comprising: a plurality of pneumatic air bearing cylinders comprising piston rods, a traveler, coupled to free ends of the piston rods, the traveler and piston rods forming a part of a traveling assembly, a cable comprising a first end coupled to the traveler and a second end coupled to the payload, a pulley configured to mate with the cable, a linear rail and carriage system configured to guide the traveling assembly, a chassis coupled to the pulley, the pneumatic air bearing cylinders and the shaft, and a pneumatic system configured to supply pressurized air to inlet ports of the pneumatic air bearing cylinders, wherein the payload and the carrier are isolated from vibrations by each other at a frequency above a resonant frequency of the cable isolator.

DETAILED DESCRIPTION OF THE INVENTION

Figure 1A:
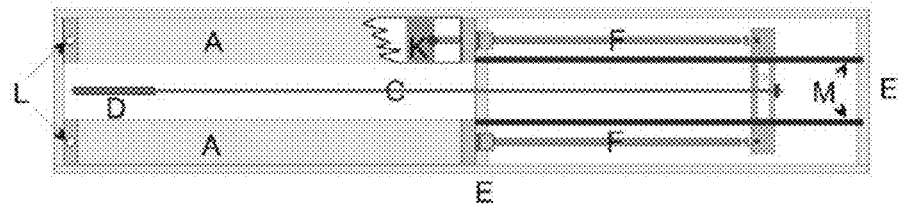
FIG. 1a shows a top view of the mechanics of the cable isolator.
Figure 1B:
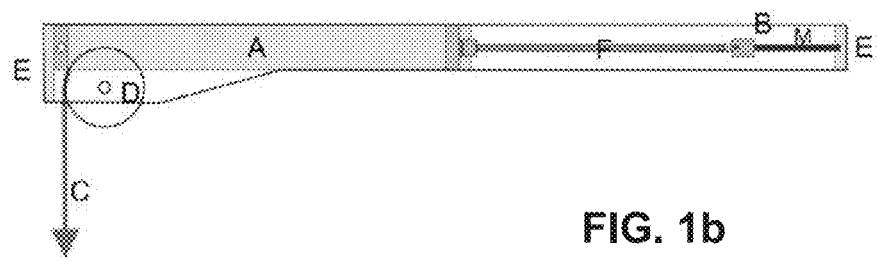
FIG. 1b shows a side view of the mechanics of the cable isolator.
Figure 1C:
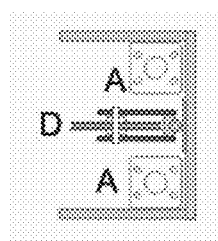
FIG. 1c shows an end view of the mechanics of the cable isolator.
Figure 1D:
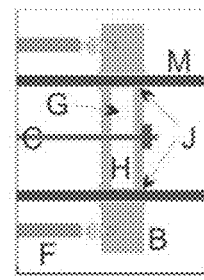
FIG. 1d shows a view of the mechanics of the traveler.

The present invention discloses a suspension and vibration isolation system comprising cable isolators. The cable isolators employ low-friction air-bearing pneumatic cylinders and cables to isolate a suspended payload from vibrations of a carrier or to isolate the carrier from vibrations of the payload. Using such air-lubricated cylinder to piston interfaces virtually eliminates static friction and so improves the effectiveness of the isolation for small forces and displacement. The use of pneumatic cylinders also permits the system to be tuned to the required resonance frequency to isolate the payload from vibrations in a desired frequency band. The invention may be deployed in a towed airborne carrier, and may be used to isolate a payload in the carrier from carrier motions above a certain cut-off frequency. The use of cables and low-friction pulleys as the link between payload and carrier allows for considerable flexibility in layout and allows for efficient use of space. The invention has particular application to acquiring high-precision, low frequency electromagnetic data from towed airborne platforms but may also be applied in other towed airborne applications where effective low-frequency, high-stroke isolation are required such as airborne gravimetry or gravity gradiometry.

The present invention discloses a cable isolator for isolating a payload from the vibrational motion of its carrier. Since each cable isolator provides support in one direction, a plurality of cable isolators may be arranged to support a payload while isolating it from the motion of its carrier in multiple directions above a cutoff frequency. The present invention also discloses such an arrangement of a plurality of cable isolators, a "suspension and isolation system", which provides multi-directional vibration isolation, as well as a means for suspending a payload. The objects of the present invention are suitable for acquiring low frequency AEM data.

An important aspect of the objects of the present disclosure is to support a hanging payload (e.g. to bear its weight) and to provide a high degree of vibrational isolation down to frequencies of 3 Hertz in a towed airborne carrier. For effective vibrational isolation, the resonant frequency must be well below the lowest frequency of 3 Hz.

According to this aspect of the present invention, it may provide the required vibration isolation down to a frequency of at least 3 Hz when implemented as a component of the stabilization system described in patent U.S. Publication No. 2011/0175604 to Polzer et al. However, the present invention may also more generally provide vibration isolation to a suspended payload at frequencies above and below 3 Hz, and may be fashioned from components which may either be metallic or non-metallic and magnetic or non-magnetic.

The cable isolator disclosed in the present invention utilizes pneumatic cylinders which act as air springs. Air springs have many desirable attributes for creating isolation systems that are effective for carrying large payloads and for providing isolation to low frequencies. A pneumatic cylinder may comprise a cylinder into which compressed air is supplied through a port, a piston head upon which the force of the compressed air is directed, and a piston rod which is attached to the piston head, extending out of the cylinder to apply a force to an object, which may be a payload. Air loss due to leakage of the compressed air between the piston head and the cylinder wall is usually minimized by employing a tight mechanical seal between the cylinder and the piston head. When tight mechanical seals are employed in a pneumatic cylinder, its cylinder may be dual-ported with a port on either end of the cylinder, and the compressed air may apply both a pushing and a pulling force on its piston rod.

While dual-ported pneumatic cylinders have the advantage of being able to apply both a pushing and a pulling force, they are not very useful for the isolation of very small amplitude vibrations, particularly at low frequencies. The problem is caused by the static friction of the contacting mechanical seal between the piston head and cylinder wall. The friction of the seal causes force to be transferred from the cylinder wall to its piston head, in part via the static friction of the seal on the cylinder wall. Pneumatic cylinders with mechanical seals imperfectly isolate vibrations in the carrier from the payload.

The cable isolator disclosed in the present invention applies the air-spring concept in a unique way which both provides extremely low friction and which also enables the payload to be suspended from above. The cable isolator comprises commercial air-bearing cylinders which have no contacting seal between the cylinder and the piston head to prevent air leakage. Air bearing cylinders are single-ported pneumatic cylinders that implement a non-contacting air bearing between the piston head and the cylinder wall which relies on tight tolerances between the two. The air on the pressurized side of the piston head leaks between the head and the wall providing virtually friction-free lubrication, so creating the air bearing. Because of this reliance on the leaking airstream for lubrication, air-bearing cylinders ("cylinders") of this kind can only be single-ported with the pressurized chamber located opposite the piston rod. Accordingly, such cylinders can only exert force while "pushing" or expelling the piston rod from the cylinder. This makes it impossible to directly hang a suspended load from air bearing cylinders located above the load without modification, as the piston heads would be pushed to the ends of their cylinders.

The cable isolators of the present invention comprise a plurality of cylinders which function in unison. A cable isolator more generally comprises a system of mechanical components, including the cylinders, and a pneumatic system for supplying air to the cylinders in the required manner. It may also comprise a controller for governing the motion of the pistons by varying the air pressures in the pneumatic system. The pneumatic control system and any controller may be independent of other cable isolators in a suspension and isolation system, or these components may be shared amongst cable isolator elements of a suspension and isolation system.

When providing vibration isolation of a payload in a towed airborne carrier, the suspension and isolation system may be configured so certain cable isolators suspend the weight of the system and provide vertical vibration isolation while other cable isolators provide vibration isolation in lateral directions. Such an airborne carrier will comprise a framework or "tow-platform", which is the structural component of the carrier to which a tow cable may be mounted, and to which elements of the suspension and isolation system of the present disclosure are mounted, from which the payload is suspended.

The mechanical components of a cable isolator may comprise a plurality of air bearing cylinders, a chassis, a traveler connected to the piston rods of the cylinders, a cable and pulleys. The cylinders and a pulley are securely mounted to the chassis, thus holding them rigidly in place with respect to each other. In the case where vibration isolation is to be in a towed carrier, the chassis may be secured to the carrier's tow-platform, as may additional pulleys. In one method of arrangement, the cable is secured to the traveler at one end and to the suspended payload at its other end, and the cable is led through at least one pulley to provide the required direction and mechanical advantage to the suspension of the payload. The force applied by the air bearing cylinders is thus transmitted through the traveler to the cable, and thence to the payload. Where a pulley is used, it is advantageous to employ the low friction variety.

The chassis may be placed opportunistically where space and structural support is available. This may be an important advantage when suspending a load within a towed airborne carrier where space and weight may be at a premium. The use of pulleys enables the use of low-friction air-bearing cylinders, which may be only used in a "push mode", to support a load suspended from above.

The chassis may be a discrete mechanical structure unique to a cable isolator, or it may be a mechanical structure shared by a plurality of cable isolators. For example, in the case of an AEM carrier, either the tow-platform may comprise a chassis, or the chassis of a cable isolator may be affixed to the tow-platform.

The force applied by the cable to the payload may be through a rigid connection, with a vibration damping fixture, such as may be fashioned from dampers and springs, or a pulley. In the latter case, the cable may be led through a pulley on the payload to terminated on a second cable isolator or to a fixed point on the tow-platform thereby enabling specific system geometries or adding mechanical advantage.

The cylinders in a cable isolator are mounted securely onto the chassis. They are aligned parallel to one another such that their pistons rods push in a common alignment direction. The ends of the piston rods terminate on a traveler, and the traveler also provides a point to which the cable is attached. The cable is preferably led from the traveler in a direction parallel to the motion of the pistons to prevent the cable from applying lateral forces or torques on the rods which may affect the air bearings. The force on the traveler from the piston rods works against the tension in the cable. A pulley, comprising a wheel rotating about an axle attached to the chassis, redirects the cable in the required direction so it may apply the required stabilizing forces to the payload. Since the cylinders may only apply a push force, and since the cable may only operate in tension, the cable must be led from the traveler to the pulley wheel in a direction towards the cylinders.

When the air bearing cylinders in a cable isolator are substantially identical, each air bearing cylinder may push with substantially the same force. In such arrangements, the cable attachment may by located at a mid-point between the piston rod attachments on the traveler where the distribution of force between cylinders and the tension in the cable results in a zero moment on the traveler. The resulting cable isolator may comprise a symmetric arrangement of cylinders about the cable attachment mid-point. For other arrangements, when the air bearing cylinders in a cable isolator are not substantially identical, the location of the cable attachment may also be located at a point which results in a zero moment on the traveler. The cable may be used either on its own or in concert with other cables from other cable isolators, to suspend and isolate a payload as part of a suspension and vibration isolation system.

A linear rail and carriage system may be used to constrain the motion of the piston rods and the traveler to be parallel to the common alignment direction. Without such a constraint, forces perpendicular to the common alignment direction may cause the piston rods to twist away from the common alignment direction. Any such twisting may impair the performance of the air bearing between the piston head and the cylinder wall. An increase in friction or increased air leakage from the pneumatic cylinder may result.

If a linear rail and carriage system is used in a cable isolator, it will be rigidly affixed to the chassis. Lateral stabilizing forces will be applied either to the piston rods, to the traveler, or to both using low friction interfaces. The low friction interfaces may comprise low friction contacting materials such as Teflon, ball or roller bearing assemblies, or linear air bearings or bushings. Stabilizing forces may also be applied using magnetic levitation or using principles relying on magnetic forces.

In particular, the linear rail and carriage system may comprise a shaft to guide the traveler in a direction parallel to the motion of the piston rods. As such, a shaft may form part of the cable isolator, and if a cable isolator comprises a shaft, the shaft is rigidly affixed to the chassis. To provide low-friction guidance where the traveler moves against the shaft, a travelling air-bearing mounted to the traveler may be employed. Pressurized air may be provided to the travelling air bearing through a coiled air line.

The cylinders in each cable isolator operate in unison so as to effectively form a single cylinder stroke. The cylinders are driven pneumatically from an air supply system. The air supply system may comprise air reservoirs, air pressure regulators, valves and air lines. Using a plurality of cylinders in each cable isolator permits the cable to be led from the traveler in a manner which permits torque-free motion of each piston rod with respect to its cylinder, so facilitating the friction-free motion of each piston rod on its air bearing. Pressurized air may be fed into a cable isolator via a supply reservoir connected with air lines to an air pump. When used to provide vibration isolation in a towed airborne carrier, the pump may be mounted on the tow cable and the air lines may run down the tow cable from the pump to the carrier.

Each cable isolator may only provide a pulling force on the payload in one direction. In general, six cable isolators mounted on orthogonal axes, with pairs of cable isolators on each axis pulling against each other on the payload, would be necessary to provide displacement stabilizing forces in three dimensions. Additional pairs of cable isolators may have their cables arranged to provide stabilizing torques on the payload about an axis. Clearly, not all payloads will warrant such treatment, and in some cases, cables may provide stabilizing forces with more than one such function. The arrangement of cable isolators deployed in any embodiment of a suspension and isolation system may depend on the nature and requirements of the payload. For example, it may not be necessary to include a downward pulling cable isolator in embodiments where the force of gravity is always in approximately the same direction on the payload. Three cable isolators with cables spaced at 120 degrees on the payload are only necessary to apply 2-dimensional horizontal stabilizing forces. In some embodiments, displacement and torque stabilization along all axial directions may not be required. In some embodiments, a cable leading from an isolator may be splayed to provide support at a number of discrete locations on the payload.

The pneumatic system of a cable isolator supplies air to the cylinders at a prescribed pressure, and controls the average position of the piston rods in a cable isolator. The pneumatic system may comprise a supply reservoir to furnish pressurized air to a pressure regulator which fills a buffer reservoir. An orifice on the outlet of the buffer reservoir may supply air to an accumulator reservoir and to the ports on the cylinders. Air continuously flows through the piston cylinders to lubricate the air bearings. The kinematic and dynamic properties of each cable isolator and of the suspension and isolation system may be adjusted by varying the volumes of the buffering and accumulator reservoirs, the regulated pressure, the areas of the orifices and piston heads, and the stroke lengths of the pistons. For example, the static load bearing capacity of the suspension and isolation system may be adjusted by varying the air pressure, the number and arrangement of load bearing cylinders and the areas of the respective cylinder heads. The resonant properties of the system may be adjusted by varying the volumes of the cylinders and the accumulator reservoirs. The size of the orifice may be adjusted to ensure the air bearing operates correctly.

The supply, buffering and accumulator reservoirs may comprise a plurality of chambers, interconnected with airlines, and controlled by valves. In so doing, volumes of the reservoirs may be adjustable. Such adjustments may be effected with a controller.

The air pressure supplied to each cable isolator may be controlled by an air regulator, and the pressures supplied to each cable isolator in a suspension and isolation system may differ. For example, a cable isolator which must support a suspended payload against the force of gravity may require a different pressure than a cable isolator which controls the lateral motions of the payload which result from motions of the carrier. Where a load must be supported against gravity, the pressure fed to those supporting cylinders times the total area of the supporting piston heads must balance the static load to be suspended. The regulated air pressure may be preset at a constant value suitable for the particular application and environment required by the payload, or it may be adjusted by a controller. In the latter case, the air pressure may be regulated in accordance with the measured motion of the payload, the motion of the piston rods, or the motion of a pulley or the cable traversing it.

Where multiple cable isolators comprise a suspension and isolation system, a single air supply source, such as an air pump, may be used to fill a shared air reservoir. Pressurized air supply may be drawn from the shared reservoir as required by each cable isolator through its pressure regulator. A controller may be used to set the pressure settings in the pressure regulators as required by each cable isolator. Each cable isolator may have its own controller, or a controller may function as part of the suspension and isolation system, regulating the air supply to each cable isolator as required.

When used with a controller, the cable isolators may be made adaptive and robust to changes in leakage around the air bearing, to variations in external atmospheric conditions such as may be encountered in airborne operations, as well as providing long-term control over payload attitude. When used on a suspended payload, the system may initially slowly increase air in an isolator that bears a static load until the load is lifted and the piston reaches the equilibrium position. During the operation phase which follows, a controller system may receive piston position information from sensors that monitor each cylinder or traveler on a continuous basis. These data may then be low-pass filtered using a cutoff frequency significantly lower than the resonant frequency of the isolator-payload system so as to provide feedback to the pressures in the pneumatic system.

The controller may read inputs from a variety of input sensors to assist either in the control of a cable isolator or a suspension and isolation system; displacement transducers may be used to monitor the piston strokes and so the location of the payload in the carrier; rotation rate actuators and gyros to monitor the motions of the pulleys or the payload; pressure gauges, thermometers, barometers may monitor the pneumatic system and the ambient atmosphere; and velocity sensors, accelerometers, inclinometers rotation rate actuators and gyros may monitor the motion of the payload.

The controller may execute a number of control functions on the air pressure supply. One function may ensure the equilibrium position of the piston within the cylinders is at a point approximately halfway through its stroke, so providing a maximum full stroke length. Another function may control aspects of the attitude of the payload, such as to keep it level. Control functions may accommodate changes in leakage rates on the air bearing piston which may change according to such variables as piston position, temperature and load shifting. In the absence of such control functions, it may be difficult to maintain an optimum equilibrium piston position in some embodiments of the present invention.

A cable isolator thus confers a number of advantages over the present state of the art. Many of these advantages are particularly germane to acquiring low-noise AEM data. Summarizing:

It provides a means of isolation by suspension with extremely low friction thereby providing isolation from small amplitude vibrations even at low frequencies.

Its resonant frequency is easily tunable by changing attached accumulator volume, the pressure, or both.

It may be mounted above a payload, minimizing structural requirements in the airborne carrier, and maximizing the volume in which a payload may travel.

It saves space since the axis of a cylinder's travel does not have to be co-aligned with or located close to the payload support. As such a cable isolator may be easily "tucked away" in a convenient place away from the suspended payload.

Any metallic or magnetic components of a cable isolator may be located at a distance from the payload.

The equilibrium position of each cable isolator may be continuously modified by a controller in a manner to optimize the ideal behavior of the payload, such as its level.

A cable isolator does not require electric power to supply any applied forces.

A controller may be located at such distance from the payload where any electromagnetic noise it may generate has negligible effect on the payload.

A cable isolator may be relatively light in comparison with systems constructed from metallic components and electrical machinery.

Any required air supply pumps may be located at a distance from the payload, diminishing any effects of their electromagnetic, acoustic and vibrational noise on any payload.

There are furthermore a number of advantages of employing a suspension and isolation system comprising cable isolators to isolate a payload from vibrations of an AEM carrier. These are:

Due to the low friction of the cable isolators, extremely small amplitude vibrations will be effectively attenuated.

The use of pneumatics allows for tuning of individual isolators to "shape" the vibrational modes of the payload to suit the flight conditions.

The use of cables and support from above allows the isolators to be tucked into the tow platform structure saving considerable space.

The suspension from above approach made possible by the cable isolators permits any the metallic parts of the suspension and isolation system to be located on the tow platform, as far from the sensors as possible.

The suspension from above approach also minimizes the structural requirements of the carrier by locating the mounting point for the suspension on the top of the carrier close to the tow point.

In the case of the stabilization system described in U.S. Publication No. 2011/0175604 A1, aspects of that system operate most effectively if the basket is kept as near level as possible. A controller system coordinating the equilibrium position of each isolator may optimize for this condition.

In one aspect the invention includes an arrangement of cable isolators. It provides an apparatus and method for a suspension and vibration isolation system in a towed AEM carrier using cable isolators. An example of a carrier in which the invention may be installed is disclosed in the U.S. Publication No. 2011/0175604 to Polzer et al. This publication describes a method and device for isolating a sensor from the motions of a carrier vehicle, with emphasis on obtaining low-noise AEM data down to a lower limit of about 3 Hz. The disclosed carrier in that patent comprises a tow frame located in the upper portion of a towed airborne carrier. The payload is suspended below the tow frame and moves within an open space in the carrier below the tow frame. Since the lowest electromagnetic acquisition frequency of interest is 3 Hz, the resonant frequency of the suspension and isolation system of the present disclosure is targeted at ½ Hz.

In one aspect the present invention comprises a set of substantially vertical and a set of substantially horizontal cable isolators 10. The substantially vertical cable isolators 10 must support the weight of the payload as well as isolate the payload from vertical accelerations of the system. The substantially horizontal cable isolators only need to isolate the payload from horizontal accelerations and do not support a significant load. In the actual installation, the substantially "horizontal" suspension elements will be in general at a shallow but inclined angle and as such will also bear some of the weight of the payload.

The mechanical system of a cable isolator is depicted in FIG. 1. Each such mechanical system consists of a pair of identical air-bearing cylinders A, a traveler B, a cable C and a pulley D. The air-bearing cylinders A and the pulley D are securely mounted to a rigid chassis E. The air-bearing cylinders A exert a pushing force through the piston head K on the piston rods F. The ends of the piston rods, one attached to the piston head and the other to the traveler, are terminated using articulating ball joints. Together, the piston head, the piston rods and the traveler form a traveling assembly which moves in unison. To maintain the force centered on the cylinder axis, the motion of the traveler is constrained by a linear rail and carriage system. This system comprises two cylindrical air-bushings J that are guided by a pair of precision ground shafts M which are also securely mounted to the chassis E. The air-bushings are fed by a manifold H within the traveler which is fed by a single port G. The traveler manifold is supplied with pressurized air through a small flexible helical air line (not shown). The pushing force of the rods on the traveler is balanced by the symmetry of the pistons and by the sharing of the inlet ports of the cylinders L with a common accumulator and supply manifold. The force of the traveler works against the tension in the cable C which is attached to the traveler B at a point centered on the mid point between the two cylinder axes. The cable C is conducted between the cylinders and over a pulley wheel D. Cables from multiple isolators are used in concert to suspend and isolate a payload.

It is important that the suspended load can move relative to the set of cable isolators fixed above and around the payload. This means that the system must accommodate different trajectories of the suspension cable relative the isolator assembly. To accommodate this freedom while keeping pulley friction to a minimum, pulleys are attached in such a way that they can pivot on an axis very nearly aligned with trajectory of the cable between the pulley and the traveler.

Figure 2:
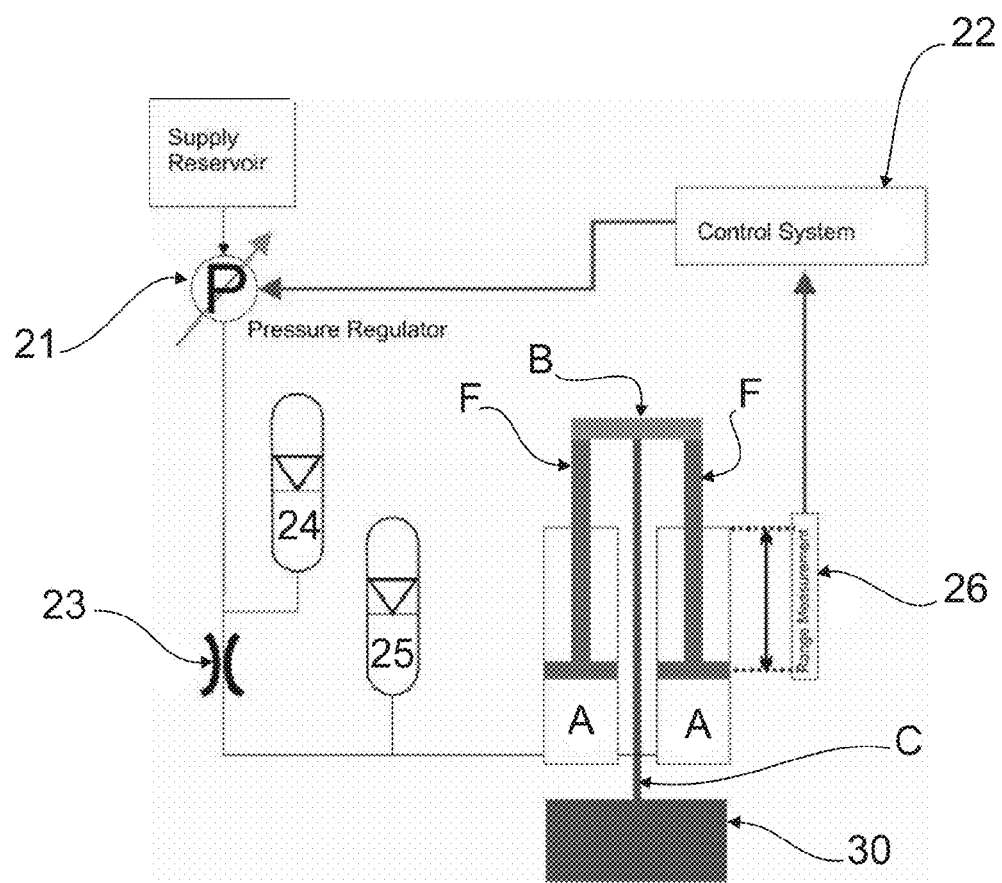
FIG. 2 is a schematic of pneumatic control system for cable isolator.

The pneumatic system for a cable isolator in one aspect of the invention is described in FIG. 2. The pneumatic system consists of a pressure regulator 21 controlled by a controller 22. Air is fed to the inlet ports of both cable isolator cylinders A through a flow-restriction orifice 23 which separates air buffering reservoir 24 and accumulator reservoir 25. A vibration isolating force is applied to the payload 30 by a cable C attached to the traveler B, which is attached to the tandem piston rods F (FIGS. 1 and 2). A range measuring device 26 may be used to determine the distance of the piston from the end of its stroke, whereby the ranges may be logged and processed by the controller 22 to provide pressure control so as to maintain the average piston position centered in the cylinder. Such control may be effected by averaging ranges over times at least ten times longer than the inverse of the resonant frequency of the cylinders.

The resonant frequency of the isolator is tuned by varying the volume of the accumulator reservoir 25. The orifice 23 must be large enough that the leakage of the air bearings within the cylinders does not create an excessive pressure drop between reservoir 24 and the cylinder chamber A. The volume of the buffering reservoir 24 is made large enough so that its pressure fluctuations caused by fluctuations in the cylinder chamber volume A during full-scale oscillations at the resonant frequency are insignificant.

In another aspect, the invention includes a controller 22, in which a proportional integral-differential (PID) algorithm is used. The PID algorithm is used to either raise or lower the pressure set by the pressure regulator so as to maintain the low-passed piston position at the equilibrium point. The equilibrium point can be preset to the center of the piston travel range to maximize stroke or it can be modified continuously based on input from other devices such as an accelerometer attached to the payload. In this way other optimal behavior can be achieved such as the maintenance of payload level as the carrier attitude changes.

An object of the present invention is a suspension and isolation system. The suspension and isolation system comprises a set of six cable isolators 10, which suspend and isolate a payload from vibrations of a carrier. The payload comprises a hanging basket-shaped 40 instrumented platform (the "basket"). The basket 40 is suspended from an upper structure, the "tow platform" 50. The overall carrier, tow-frame and payload system is described in detail in U.S. Publication No. 2011/0175604 A1 to Polzer et al. However, that patent did not specify the means of suspension and vibration isolation of the basket and payload, which is disclosed herein.

Figure 3:
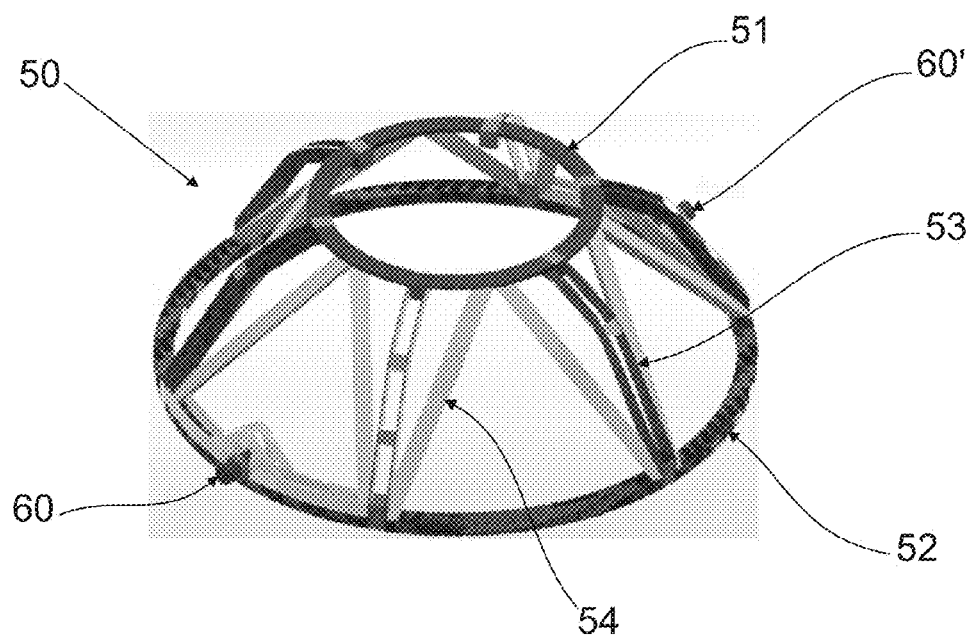
FIG. 3 shows a tow frame according to one aspect of the invention.

In one aspect of the present invention, the suspension and isolation system is installed on the tow platform 50 (FIG. 3), which has a roughly hemispherical form. The tow platform 50 comprises a smaller upper ring 51 which is linked to a larger coaxial base ring 52 by a system of radial pillars 53 and diagonal braces 54 (FIG. 3). The tow platform 50 is attached to the tow cable through two axles 60, 60' mounted on the base ring 52. The suspension and isolation system of the present disclosure suspends the basket 40, and so isolates the instrumented platform from vibrations of the carrier.

In another aspect of the invention, the suspension and isolation system comprises six cable isolators 10 of two types. A first-type of three of the cable isolators 10 applies force to the payload in a substantially vertical direction. These first-type cable isolators 10, with the pulley D located near the upper ring 51 of the tow platform 50, suspend most of the static load and substantially isolate the payload from vertical vibrations of the carrier. A second-type of three cable isolators 10, with the pulley D located near the base ring 52 of the tow platform 50, apply force in a substantially radial direction and so isolate the basket 40 from lateral vibrations of the carrier. While in one aspect the invention comprises six cable isolators 10, a symmetric arrangement of eight isolators 10 is equally viable.

Figure 4A:
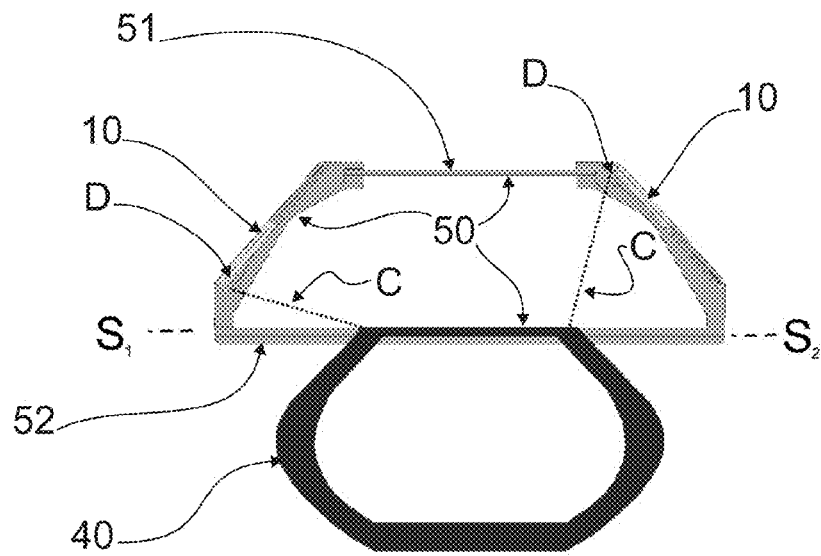
FIG. 4a shows a schematic section view showing aspects of the suspension and isolation system.
Figure 4B:
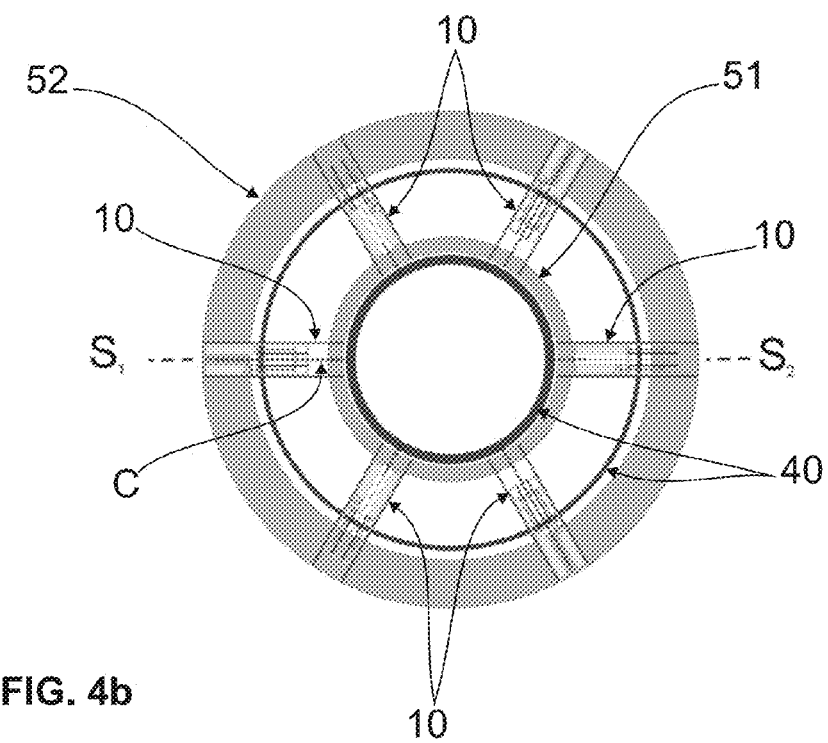
FIG. 4b shows a schematic plan view showing aspects of the suspension and isolation system.

FIG. 4 show aspects of the suspension and isolation system as a schematic section (FIG. 4*a*) and as a plan view (FIG. 4*b*). These figures schematically illustrate the basket 40, the upper (51) and base (52) rings of the tow platform 50, the cable isolators, 10, the pulleys D, and the cables C which extend past the pulleys of the cable isolators to the basket. The section view of FIG. 4*a* depicts the disposition of two cable isolators on the tow frame located on the section S1-S2. On the left side of FIG. 4*a*, a cable isolator providing horizontal (radial) motion isolation is illustrated, with its pulley D being located near the lower part of the tow platform. On the right side of the figure a cable isolator is illustrated with its pulley D being located near the upper part of the tow platform, so providing suspension and vertical motion isolation. In one aspect, the roles of six such isolators alternate between vertical cable support and radial cable support at 60 degree intervals around the circumference of the tow platform. The disposition of six such cable isolators in total around the tow frame is illustrated in FIG. 4*b*. In the suspension and isolation system, each type of the cable isolators 10 is deployed at 120 degree intervals around the circle of the tow platform 50. The direction of cable pull is alternated from largely vertical to largely horizontal by reversing the up-down direction of each successive cable isolator 10 and so the location of the respective pulleys, D.

Figure 5:
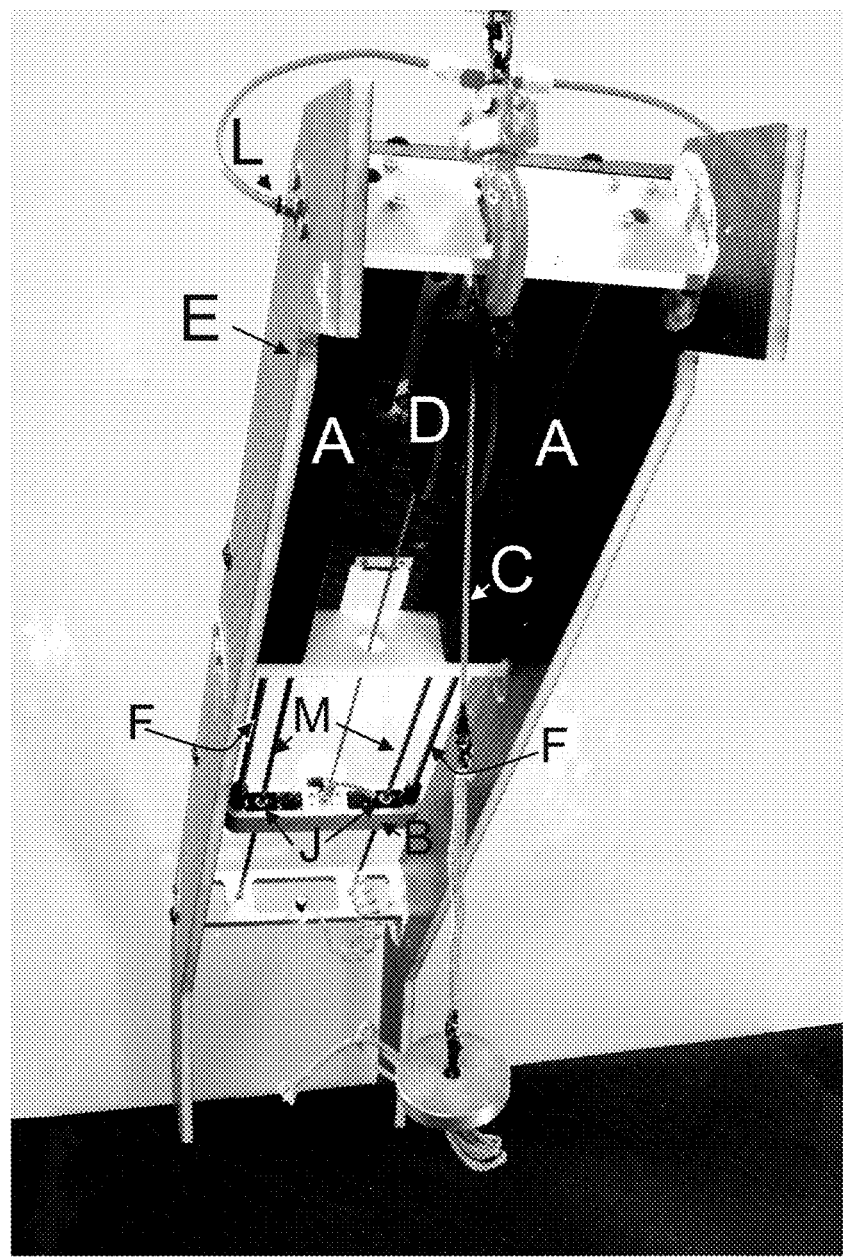
FIG. 5 shows a cable isolator chassis mounted on the tow platform.

FIG. 5 shows a cable isolator, 10, with its chassis E separated from the tow platform. It is positioned as it would be to provide vertical payload support through the cable. In this orientation the air bearing cylinders A push in tandem on the traveler B through piston rods F thereby pulling on the cable C and lifting the payload. The traveler slides on the shafts M lubricated by air-bushings J.

What is claimed is:

1. A cable isolator for isolating vibrations between a carrier and a payload, comprising:
    a plurality of pneumatic air bearing cylinders each having a piston rod,
    a traveler, coupled to free ends of the piston rods, the traveler and piston rods forming a part of a traveling assembly, a cable comprising a first end coupled to the traveler and a second end coupled to the payload, a pulley configured to mate with the cable, a linear rail and carriage system configured to guide the traveling assembly, a chassis coupled to the pulley, the pneumatic air bearing cylinders and a shaft, and a pneumatic system configured to supply pressurized air to inlet ports of the pneumatic air bearing cylinders, wherein the payload and the carrier are isolated from vibrations by each other at a frequency above a resonant frequency of the cable isolator.

2. The cable isolator of claim 1, wherein the plurality of pneumatic air bearing cylinders are identical in construction.

3. The cable isolator of claim 1, wherein the chassis is securely coupled to framework of the carrier.

4. The cable isolator of claim 1, wherein each of the pneumatic air bearing cylinders is rigidly coupled to the chassis and aligned on a common alignment direction, wherein a piston of each of the pneumatic air bearing cylinders is configured to push to result in a zero moment on the traveler when balanced against tension of the cable; each piston being configured to push in unison in a common direction parallel to the common alignment direction when air pressure is applied to a cylinder portion of the air bearing cylinders.

5. The cable isolator of claim 1, wherein the piston rod of each of the pneumatic air bearing cylinders terminates at a first end on the traveler, and at a second end on a center of a piston head.

6. The cable isolator of claim 4, wherein the cable is configured to be drawn from the traveler in a direction parallel to the common alignment direction, and toward the air bearing cylinders so that tension in the cable opposes a force applied by the piston rods of the air bearing cylinders on the traveler.

7. The cable isolator of claim 1, wherein the pulley is coupled to the chassis wherein a wheel of the pulley is configured to rotate and mate with the cable so the cable can exert a force on the traveler and the payload.

8. The cable isolator of claim 1, wherein the linear rail and carriage system is rigidly coupled to the chassis and configured to constrain the traveling assembly to move in a direction parallel to the common alignment direction, so the traveling assembly can move smoothly and friction free, and wherein the linear rail and carriage system is configured to constrain and guide displacements of the traveling assembly to lie in a direction parallel to the common alignment direction.

9. The cable isolator of claim 1, wherein the pneumatic system comprises an air supply and an air pressure regulator to deliver a regulated supply of pressurized air to the inlet ports of the pneumatic air bearing cylinders through an air supply line.

10. The cable isolator of claim 9, wherein the pneumatic system is configured to supply air pressure and air flow rates to the inlet ports of the pneumatic air bearing cylinders to provide a required force on the traveler to maintain a zero moment.

11. The cable isolator of claim 10, wherein the pneumatic air bearing cylinders comprise a symmetric arrangement, the pneumatic system being configured to supply identical air pressure to each of the pneumatic air bearing cylinders, so that the pneumatic air bearing cylinders operate in unison.

12. The cable isolator of claim 10, wherein the pneumatic system is configured to supply air pressure to the pneumatic air bearing cylinders to apply a force on respective piston heads to move in a frictionless motion via an air bearing.

13. The cable isolator of claim 1, wherein the cable is configured to mate with a plurality of pulleys to apply a force in a required direction and with a required mechanical advantage to the payload.

14. The cable isolator of claim 1, wherein the cable is configured to apply force to the payload in a substantially horizontal direction, wherein the payload is vibrationally isolated from the effects of lateral motions of the carrier.

15. The cable isolator of claim 1, wherein the cable is configured to apply a force to the payload in a substantially vertical direction, wherein the payload is suspended by the cable isolator and is vibrationally isolated from the effects of vertical motions of the carrier.

16. The cable isolator of claim 1, wherein the linear rail and carriage system comprises a shaft rigidly coupled to the chassis and oriented in a direction parallel to the common alignment direction, the shaft being coupled to the traveler through a hole in the traveler, to permit the traveler being configured to move smoothly along the shaft friction free, and wherein the traveler comprises a plurality of separate holes for receiving a plurality of shafts, and whereby an air bearing is configured to provide a low friction motion.

17. The cable isolator of claim 9, comprising a controller and an input sensor, the input sensor selected from the group consisting of displacement transducers, velocity sensors, load cells, strain gauges, accelerometers, inclinometers, rotation rate actuators, gyros, pressure gauges, thermometers, barometers, and infrared, radar and laser rangers, wherein the controller is configured to adjust the air pressure regulator to control the cable isolator.

18. The cable isolator of claim 1, wherein the carrier is a vehicle and the payload is suspended, the cable isolator being configured to isolate the payload from vibrations of the carrier.

19. The cable isolator of claim 18, wherein the cable isolator is a tow frame of a towed carrier.

20. The cable isolator of claim 18, wherein the carrier is an airborne carrier and wherein the payload comprises an instrument selected from the group consisting of gravity meters, gravity gradiometers, magnetometers, induction coils, radars, lidars, accelerometers, rotation rate actuators, optical sensors, cameras and pointing devices.

21. The cable isolator of claim 9, wherein the carrier is a towed airborne electromagnetic bird, the payload comprises a magnetometer, the cable isolator being configured to isolate the payload from carrier vibrations at frequencies of at least about 3 Hz.

22. The cable isolator of claim 10, wherein the pneumatic system comprises, a buffering reservoir, an accumulator reservoir, a first supply line connecting the air pressure regulator to the buffering reservoir, a second supply line connecting the buffering reservoir to the accumulator reservoir, a manifold connecting the inlet ports of respective cylinder portions of the pneumatic air bearing cylinders, and a third supply line connecting the manifold to the second supply line, wherein:

the air pressure regulator controls the air pressure from the air supply into the buffering reservoir, the buffering reservoir being configured to hold pressurized air at a pressure set by the air pressure regulator and cause air at the regulated pressure to flow to the accumulator reservoir, the buffering reservoir having a volume that minimizes pressure variations resulting from pressure fluctuations in the pneumatic air bearing cylinders, wherein:
the second supply line comprises an orifice to control air flow through the second supply line to match air losses from air bearings of the air bearing cylinders,
the first, second and third supply lines having a capacity so that any pressure drop along the first, second or third supply lines does not interfere with air transfer between the reservoirs, and the capacity being sufficient to supply air at a required rate to the air bearings in the pneumatic cylinders so they function correctly,
the accumulator reservoir having an adjustable volume to control the resonant frequency of the cable isolator, and
the buffering and accumulator reservoirs and a supply reservoir being coupled to a framework of the carrier.

23. The cable isolator of claim 22, wherein the supply, buffering and accumulator reservoirs comprise a plurality of chambers interconnected by valves, each of the reservoirs having an adjustable volume to control the cable isolator's resonant and pneumatic properties.

24. A vibration isolation and suspension system for suspending a payload from a carrier, and for isolating vibrations between the carrier and the payload, comprising a plurality of cable isolators according to claim 1, wherein:
the carrier comprises a framework,
the chassis being coupled to the framework,
the cable being configured to apply a force to the payload in a plurality of directions, and
the cable being configured to suspend the force to the payload.

25. The vibration isolation and suspension system of claim 24, wherein the cable isolators are configured to:
apply force to the payload in at least three different horizontal directions, and
apply force to the payload in a substantially vertical direction,
wherein the payload is suspended and isolated from vibrations in three dimensions, and whereby one or more of the cable isolators are configured to apply horizontal forces to the payload and one or more of the cable isolators are configured to apply vertical forces to the payload.

26. The vibration isolation and suspension system of claim 24, comprising a controller, wherein the controller is configured to optimize the function of the vibration isolation and suspension system by receiving an input from an input sensor selected from the group consisting of displacement transducers, velocity sensors, load cells, strain gauges, accelerometers, inclinometers, rotation rate actuators, gyros, pressure gauges, thermometers, barometers, and infrared, radar and laser rangers, whereby the controller is configured to adjust an air pressure in an air pressure regulator of at least one of the cable isolators which comprises the vibration isolation and suspension system.

27. The vibration isolation and suspension system of claim 26, wherein the controller is configured to:
receive inputs from displacement transducers which measure displacements of the travelers of the cable isolators, and
send outputs which vary settings of the air pressure regulators of the cable isolators in accordance with the inputs.

28. The vibration isolation and suspension system of claim 24, wherein the carrier is an airborne carrier, and the payload comprises an instrument selected from the group consisting of gravity meters, gravity gradiometers, magnetometers, induction coils, radars, lidars, accelerometers, rotation rate actuators, optical sensors, cameras and pointing devices.

29. The vibration isolation and suspension system of claim 24 wherein
the framework is the tow-frame of a towed airborne carrier,
the towed airborne carrier comprises an airborne electromagnetic system,
the payload comprises an airborne magnetometer,
a resonant frequency of the cable isolators, and of the vibration isolation and suspension system is less than about 1 Hz,
carrier vibrations are isolated from the payload at frequencies of at least about 3Hz,
at least three cable isolators are configured to provide vibration isolation in horizontal directions, and
at least one cable isolator is configured to provide vibration isolation in a vertical direction.

* * * * *